United States Patent [19]
Kosmider et al.

[11] 3,792,849
[45] Feb. 19, 1974

[54] APPARATUS FOR DESULPHURIZING PIG IRON

[75] Inventors: Hans Kosmider, Bremen-Lesum; Dieter Danckert, Meyenburg, both of Germany

[73] Assignee: Klockner-Werke AG, Duisburg, Germany

[22] Filed: Nov. 13, 1972

[21] Appl. No.: 305,831

Related U.S. Application Data

[62] Division of Ser. No. 115,296, Feb. 16, 1971, Pat. No. 3,715,202.

[30] Foreign Application Priority Data
Mar. 6, 1970   Germany............................ 2010585

[52] U.S. Cl............................................. 266/34 T
[51] Int. Cl............................................. C21c 7/02
[58] Field of Search ................................. 75/53–58; 266/34 T, 34 PP, 38–40, 42

[56] References Cited
UNITED STATES PATENTS

| 714,451 | 11/1902 | Carson | 266/35 |
| 894,779 | 7/1908 | Muirhead | 75/60 |
| 2,639,984 | 5/1953 | Jordan | 75/60 |
| 2,692,196 | 10/1954 | Hulme | 75/58 |
| 2,975,047 | 3/1961 | Leroy et al. | 266/34 PP |

Primary Examiner—Gerald A. Dost
Attorney, Agent, or Firm—Ross, Ross & Flavin

[57] ABSTRACT

Apparatus for desulphurizing pig iron wherewith a pig iron stream is allowed, in a continuous flow, first to fall as it is tapped from a cooperant blast furnace with means for allowing the feeding of an ascending desulphurizer into the falling pig iron stream and then to ascend with means for allowing the feeding of an ascending desulphurizer into the ascending pig iron stream.

5 Claims, 1 Drawing Figure

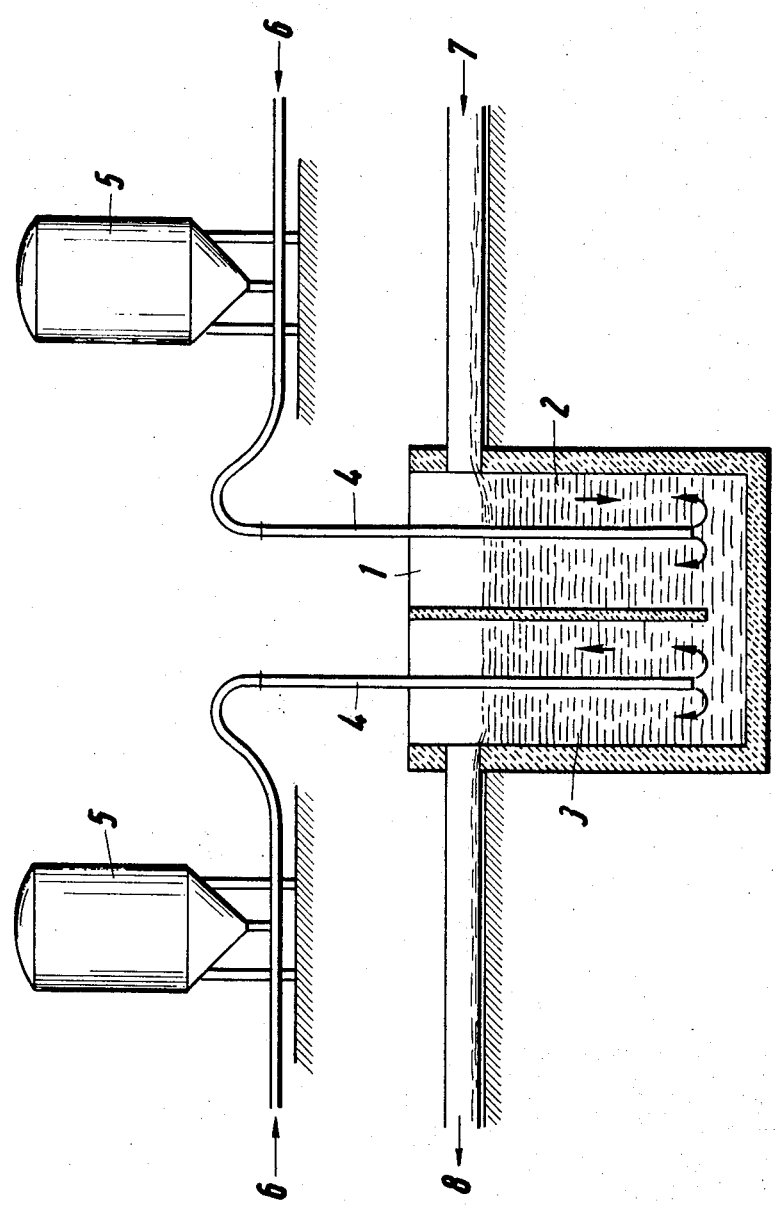

APPARATUS FOR DESULPHURIZING PIG IRON

The invention relates to apparatus for the desulphurization of pig iron and is a division of application Ser. No. 115,296 filed Feb. 16, 1971, and now U.S. Pat. No. 3,715,202.

Iron is extracted from iron ore and concentrates by pyrometallurgical processes involving the application of heat and reducing gases. At temperatures of 700° – 1100°C, iron oxides, such as hematite ($Fe_2O_3$) and magnetite ($Fe_3O_4$), the principal iron-bearing minerals, are readily reduced to metallic iron.

The blast-furnace process is the most widely used method of producing molten pig iron which can be cast into useful shapes or refined into steel. Employing coke, it produces molten pig iron containing about 4.0 percent carbon and a total of about 3.0 percent of manganese, silicon and phosphorus, which must be removed in the conversion of pig iron into steel.

Pig iron is the direct metallic product, either solid or molten, of a blast furnace smelting iron ore. Such pig iron, either solid or molten, has the capacity to absorb a portion of the sulphur contained in the coking ash.

Depending upon slag ratio and slag quantity, the sulphur content of pig iron normally varies between 0.025 and 0.100 percent.

Sulphur deleteriously affects the mechanical properties of the resultant iron and steel products, ergo any sulphur content of the pig iron, in excess of an admissible limit, has to be reduced outside of or following the blast furnace.

The admissible limit of sulphur content in pig iron for the production of an ordinary low carbon steel is about 0.030 percent.

Pig iron produced in the blast furnace and allowing anything more than 0.030 percent of sulphur must be subsequently desulphurized.

It is known to desulphurize pig iron outside of or following the blast furnace by way of filling a ladle with the pig iron and adding thereto, as a single charge or in a series of smaller incremental charges, soda in granulated or powder form.

It is also known to blow by pneumatic means a lime or calcium carbide powder into the inactive pig iron in the ladle by means of an immersion lance. But this comprehends a discontinuous method, wherefor the pig iron to be desulphurized must first be collected in the ladle in order to desulphurize the total ladle content. Such large quantities of pig iron have to be desulphurized in most metallurigical plants that this method is relatively expensive and obviously impractical.

The primary object of this invention to provide new and novel apparatus for continuously desulphurizing pig iron which apparatus is normally disposed behind the skimmer in the blast furnace tapping spout.

The apparatus hereof comprehends a continuously flowing, first falling and then ascending, pig iron stream, in which the desulphurizer first ascends opposite to and then ascends in the flow direction of the pig iron stream.

The apparatus is characterized by the fact that the reaction chamber is constructed as a communicating tube having a pair of tube arms. A blowing lance is disposed in one or both of the tube arms, which blowing lance is provided with one or more outlets.

The apparatus offers the advantage that the pig iron produced in the blast furnace may be continuously desulphurized so that the need for collection of larger molten quantities in a ladle following desulphurization is obviated, and the pig iron is in fact desulphurized during passage through the tapping spout, all wherefore considerable losses in time and money may be avoided, of special importance when and where large pig iron quantities have to be desulphurized.

Generally, it will be sufficient, if the desulphurizer ascends in the continuously flowing, falling pig iron stream opposite to its flowing direction. However, if the sulphur content is desired to be further reduced, it is possible to blow a desulphurizer additionally into the tube, in which the pig iron stream ascends, which desulphurizer then ascends with ascending pig iron stream.

Conversely, it is possible herewith to desulphurize only in the ascending pig iron stream but desulphurization is not as effective in such instance.

Which method is used in a given case is dependent upon the quantity of sulphur dictated to be removed from the pig iron.

Adaptation of the apparatus for carrying out the single or combined desulphurization is easily effected, it being only necessary to push either one or both of the blowing lances into the apparatus, and then to charge the stream with the desulphurizer. The apparatus, therefore, may be easily adapted to provide the desired sulphur content during the already running desulphurizing process.

The degree of desulphurization is dependent upon: 1) the holding time of the pig iron in the reactor, 2) the immersion depth of the blowing lance, 3) the grain size of the desulphurizer, 4) the quantity of the desulphurizer (kg per ton of pig iron), 5) the initial sulphuric content, and 6) the desired final content of sulphur in the pig iron.

According to the invention, the holding time of the pig iron in each reactor vessel should not be below 45 sec. and the smallest depth of immersion of the blowing lance should not be below 60 cm. A grain of $60\mu$ with a grain dispersion range of $10-100\,\mu$ has been found to be very effective.

According to one illustrative example, desulphurization is carried out by a counterflowing method in which the initial sulphuric content of the pig iron amounted to 0.045 percent. With a calcium-carbide consumption of 4 kg per ton of pig iron and during a holding time of 85 sec., the sulphur content was reduced to 0.017 percent uniformly over the total tapping.

The apparatus is explained by way of example in the accompanying drawing, representative of a preferred embodiment.

A desulphurization vessel 1 has the general form of a communicating tube and consists of a pair of tube arms 2 and 3 spaced from each other by a central separator wall.

Flowing in the direction of arrow 7, the pig iron is tapped from the blast furnace, first enters tube arm 2 where it forms a falling stream, flows under the separator wall, then ascends in tube arm 3, and then flows through a spout in direction of arrow 8 to the ladle.

The desulphurizer is introduced into the falling stream in tube arm 2, as well as into the ascending stream in tube arm 3, by means of respective blowing lances 4.

In tube arm 2, the desulphurizer flows in a direction (upward) opposite to the flowing direction (downward) of the pig iron stream according to the arrows indicated at the end of blowing lances 4, while in tube arm 3, the desulphurizer flows in a direction (upward) with the flowing direction (upward) of the pig iron stream.

Desulphurizer silos are indicated at 5 and the desulphurizer passes therefrom via the connection pipes of blowing lances 4. The desulphurizer is pneumatically charged by means of compressed air which is flowing in the direction of the respective arrow 6.

Pig iron tapped from a melting device may be immediately desulphurized, with the desulphurizer being continuously blown into the pig iron stream by means of one or more blowing lances.

As a desulphurizer, a fine-grained calcium-carbide powder may be used, which at a grain of 60 $\mu$ has a grain dispersion range of between 10 and 100 $\mu$.

The pig iron stream is charged with the desulphurizer for a duration of at least 45 sec. and each lance is immersed into the pig iron stream for a length of at least 60 cm.

We claim:

1. In apparatus for the desulphurization of pig iron continuously flowing from a blast furnace, in passage to a ladle, the combination of:

a desulphurization vessel communicating with and connected to the passage and including a pair of tube arms separated from each other by a separator wall, a source of desulphurizer and a connection pipe of a blowing lance for each tube arm, with the pig iron from the blast furnace being charged into and falling in a first of the tube arms and passing therefrom and ascending in the second of the tube arms and passing returnably to the passage for conduct to the ladle, and with one connection pipe of a blowing lance communicating with the first of the tube arms for the feeding of an ascending desulphurizer into the falling pig iron stream and with the second connection pipe of a blowing lance communicating with the second of the tube arms for the feeding of an ascending desulphurizer into the ascending pig iron stream.

2. Apparatus, according to claim 1 characterized in that the desulphurization vessel is constructed as a communicating tube with a pair of tube arms each having a blowing lance.

3. Apparatus, according to claim 2, characterized in that the blowing lance is provided with one or more outlets.

4. Device, according to claim 2, characterized in that the device is arranged behind the skimmer of the blast furnace spout.

5. In apparatus for the desulphurization of pig iron continuously flowing via a passage from a blast furnace to a ladle, the combination of: a desulphurization vessel communicating with and connected
   to the passage and including first and second tube arms separated from each other throughout the respective
   major portions of their heights by a separator wall, a source of desulphurizer and a connection pipe in the form of a blowing lance for each tube arm, the pig iron in the passage being charged therefrom into and descending in the first tube arm and passing therefrom into and ascending in the second tube arm and being charged therefrom returnably to the passage for flow to the ladle, one of the blowing lances communicating with the first tube arm for the feeding of the ascending desulphurizer into the descending pig iron stream and the other of the blowing lances communicating with the second tube arm for the feeding of the ascending desulphurizer into the ascending pig iron stream.

* * * * *